United States Patent [19]

Suslin et al.

[11] 4,083,767
[45] Apr. 11, 1978

[54] APPARATUS FOR ELECTROCHEMICAL MACHINING OF WORKPIECES

[76] Inventors: Vladimir Isaakovich Suslin, ulitsa Frunze, 17, kv. 46; Alexandr Ivanovich Dubovik, ulitsa Gvardeitsev Shironintsev, 63a, kv. 22; Boris Anatolievich Makeev, ulitsa Novgorodskaya, 6, kv. 29; Pavela Semenovich Razdymakha, ulitsa Bljukhera, 26, kv. 121; Zinovy Abramovich Lekarev, ulitsa Trinklera, 20, kv. 71, all of Kharkov, U.S.S.R.

[21] Appl. No.: 814,096

[22] Filed: Jul. 8, 1977

[30] Foreign Application Priority Data

Jul. 13, 1976 U.S.S.R. .............................. 2374202

[51] Int. Cl.² ............................ B23P 1/12; B23P 1/16
[52] U.S. Cl. ................................ 204/224 M; 204/225; 204/275
[58] Field of Search ............... 204/224 M, 224 R, 225, 204/275

[56] References Cited

U.S. PATENT DOCUMENTS

| 3,409,535 | 11/1968 | Ross et al. | 204/224 M |
| 3,761,367 | 9/1973 | Zubak et al. | 204/224 X |
| 3,773,636 | 11/1973 | Augustin | 204/224 M X |
| 3,857,772 | 12/1974 | Sasaki et al. | 204/275 X |

Primary Examiner—John H. Mack
Assistant Examiner—D. R. Valentine
Attorney, Agent, or Firm—Robert E. Burns; Emmanuel J. Lobato; Bruce L. Adams

[57] ABSTRACT

The apparatus for electrochemical machining of workpieces comprises an electrode tool adapted to be fed during a machining operation toward the workpiece mounted on a work table and to be retracted from the workpiece for an inter-operation interval, a pump arranged in a common line upstream of the point of branching off of the working line for supplying the working fluid from a tank to the workpiece and of a bypass line for circulation of the fluid through an intermediate vessel into the tank for the fluid, and also a line switching control means connected with the control elements of individual valves mounted in the working and bypass lines, the means having two rods rigidly connected with the electrode tool and extending in the direction of the feed of the latter, their length being adjustable, the individual valves being fixed on the work table, each under the respective one of said rods, for interaction of the rod with the control element of the respective valve, as the electrode tool is being fed toward the workpiece, the valve in the bypass line being adapted to close this line, as the rod acts upon the control element thereof, and to open the bypass line, when the last-mentioned action ceases, the valve in the working line being arranged for a reverse performance.

1 Claim, 2 Drawing Figures

APPARATUS FOR ELECTROCHEMICAL MACHINING OF WORKPIECES

FIELD OF USES OF THE INVENTION

The invention relates to the art of electrochemical machining of metal workpieces, and, more particularly, it relates to an apparatus for electrochemical machining of workpieces by means of a working fluid, such apparatus being incorporable in electro-erosion, electro-chemical, piercing-copying and other machines where it is essential that notwithstanding rapid and frequent replacement of workpieces being machined, there should be provided normal operating duty of the pump supplying the fluid to the machining area.

BACKGROUND OF THE INVENTION

It is commonly known that under the conditions of industrial machining of workpieces, the number of the instances of starting the pump for a machining operation and stopping it for either workpiece replacement or some other interoperation interval can be as great as 6 to 10 times per minute, which is a highly unwanted operating duty for a pump, eventually resulting in untimely wear and even complete failure of the latter.

A hitherto known arrangement for electrochemical machining of workpieces, providing for a normal operating duty of the pump, comprises an electrode tool adapted to be fed during a machining operation toward the workpiece supported on a work table and to be retracted from this workpiece for an inter-operation interval, a pump mounted in a common line upstream of the point of branching off of a working line for supplying the working fluid from a tank to the workpiece being machined and of a bypass line for circulation of the working fluid through an intermediate vessel into the fluid tank, and also line switching control means coupled with the control elements of individual valves mounted in the respective ones of the lines and adapted to open, now, the flow through the working line as the electrode tool is being fed toward the workpiece, then, the flow through the bypass line during an inter-operation interval.

The line switching control means in the known arrangement comprises two individual electric actuators operatively connected each with the control element of the respective valve and electrically coupled to an electric circuit setting out the operating cycle diagram of the arrangement.

As the electrode tool is fed toward the workpiece, the aforementioned electronic circuit sends a command signal to energize the individual actuator coupled with the valve mounted in the working line, and another command signal to deenergize the individual actuator coupled with the valve in the bypass line. In this way the flow through the working line is opened, and the flow through the bypass line is arrested.

For the duration of an inter-operation interval, in a similar way the bypass line is opened, and the working line is closed.

Every switching operation in the aforementioned arrangement is dependable on a relatively complicated electronic and electric equipment which, however, is not as reliable as mechanical connections.

Besides, the known arrangement inclues individual means for adjusting the rate of flow of the working fluid, which further complicates both the structure and performance of the arrangement.

BRIEF DESCRIPTION OF THE INVENTION

It is an object of the present invention to simplify the fluid line switching control means.

It is another object of the present invention to enhance the reliability of the operation of the apparatus, owing to rapid, easy and dependable switching over of the valves of the working and bypass lines.

It is still another object of the present invention to provide a fluid line switching control means within a single structural assembly with the working fluid flow rate adjustment means.

With these and other objects in view, the essence of the present invention resides in an apparatus for electrochemical machining of workpieces, comprising an electrode tool adapted to be fed during a machining operation toward a workpiece mounted on a work table and to be retracted from the workpiece during an inter-operation interval, a pump mounted in a common fluid line upstream of the point of branching off of a working line for supplying the working fluid from a tank to the workpiece being machined and of a bypass line for circulation of the working fluid through an intermediate vessel into the fluid tank, and also a line switching control means connected with the control elements of individual valves mounted in the working and bypass lines, adapted to open, now, the working line during the feed of the electrode tool toward the workpiece being machined, now, the bypass line for an inter-operation interval, in which apparatus, in accordance with the present invention, the line switching control means includes two rods rigidly connected with the electrode tool and extending in the direction of its feed, with the lengths of the rods being adjustable, while the valves are mounted on the work table, each directly under the respective one of the rods, for interaction of the rod with the control element of the respective valve, as the electrode tool is being fed toward the workpiece, the valve mounted in the bypass line being adapted to close this bypass line under the action of the respective rod upon the control element thereof, and to open this bypass line as the last-mentioned action ceases, whereas the valve in the working line is adapted for a reverse performance.

BRIEF DESCRIPTION OF APPENDED DRAWINGS

Other objects and advantages of the present invention will be made apparent hereinbelow, in the detailed description of an embodiment of the invention, with reference being had to the accompanying drawings, wherein.

DETAILED DESCRIPTION OF THE INVENTION

Figure 1:
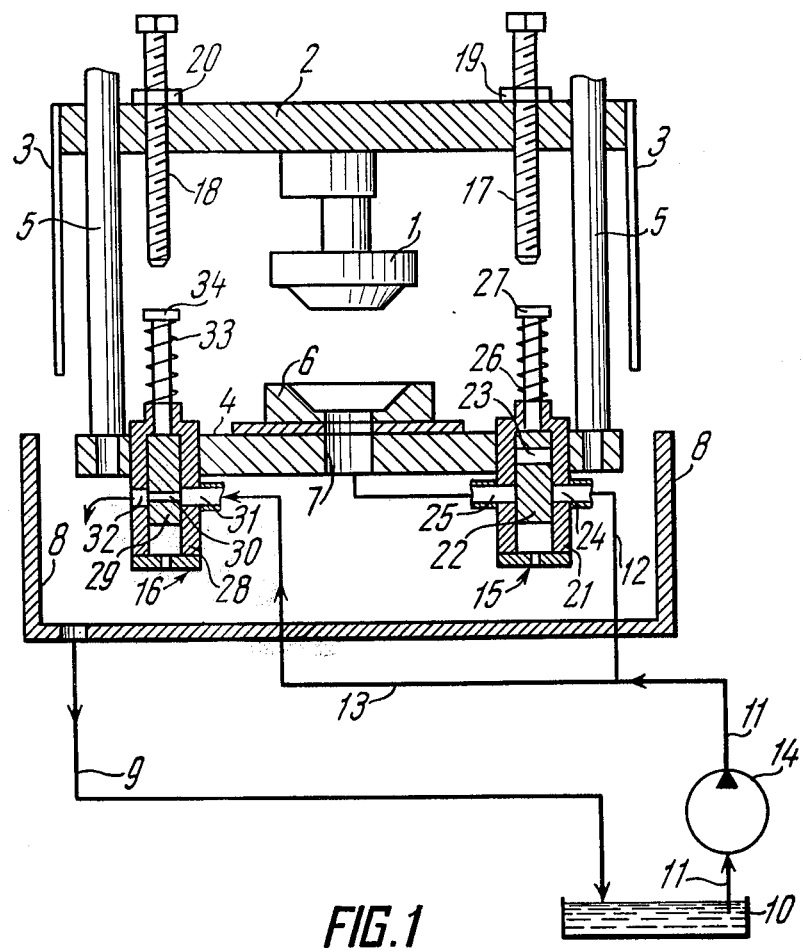
FIG. 1 is a longitudinal sectional view of an apparatus for electrochemical machining of workpieces in accordance with the invention, with the valve in the bypass line open.

The apparatus for electrochemical machining of workpieces comprises an electrode tool 1 (FIG. 1) mounted in a crossbeam 2 provided with a guard or shield 3, overlying the work table 4 of the apparatus and being vertically reciprocable along guideways 5 vertically supported by the work table 4, also supporting at the centre thereof a metal workpiece 6 being machined.

Directly underlying the work table 4 provided with a through-going bore 7 for introduction of the working fluid, there is arranged an intermediate vessel 8 adapted to collect therein the working fluid, coupled via a line 9 with a fluid supply tank 10, the working fluid being, e.g. either an electrolyte or a detergent solution.

A common fluid line 11 leading from the supply tank 10 branches away into a working line 12 for supplying the working fluid from the supply tank 10 to the workpiece 6 being machined, and into a bypass line 13 for circulation of the working fluid coming from the supply tank 10 through the intermediate vessel 8 and the line 9 back into the supply tank 10.

The supply pump 14 of the delivery type is mounted in the common line 11 upstream of the point of the branching off of the working line 12 and of the bypass line 13.

The working line 12 has mounted therein an individual valve 15, and the bypass line 13 has mounted therein an individual valve 16.

The means for controlling the switching over of the lines 12 and 13 includes rods 17 and 18 rigidly coupled with the crossbeam 2 by means of respective threaded connections and locked in adjusted positions, respectively, with lock nuts 19 and 20. The rods 17 and 18 are mounted in the crossbeam 2 so that they extend in the direction of the motion of the crossbeam 2 with the electrode tool 1.

The valve 15 includes a cylindrical valve housing 21 accommodating therein a reciprocable spool valve member 22 having in the upper portion thereof a flow passage 23 which is aligned in the lowermost position of the valve member 22 with an inlet 24 and an outlet 25 provided in the housing 21, establishing communication therebetween. The control element of the valve 15 consists of a spring 26 received about a stem 27 fast with the valve member 22.

The valve 16 likewise has a cylindrical valve housing 28 accommodating therein a reciprocable spool valve member 29 having in the lower portion thereof a flow passage 30 alignable in the uppermost position of the valve member 29 with an inlet 31 and an outlet 32 provided in the housing 28. The control element of the valve 16 includes a spring 33 received about a stem 34 fast with the valve member 29.

The valve 15 is fixed on the work table 4 immediately under the rod 17, the stem 27 being axially aligned with this rod 17.

The valve 16 is fixed on the work table 4 immediately under the rod 18, the stem 34 being axially aligned with the rod 18.

The rods 17 and 18 are fixed for adjustment of their active vertical length.

This enables to adjust this active vertical length of the rods 17 and 18 to correspond to the vertical dimension of the workpiece 6, and also enables to control the flow rate of the working fluid.

FIG. 1 of the appended drawings illustrates a position whereat the flow passage 30 of the spool valve member 29 is aligned with the inlet 31 and the outlet 32 of the housing 28 of the valve 16, i.e. the open position of the latter.

Figure 2:
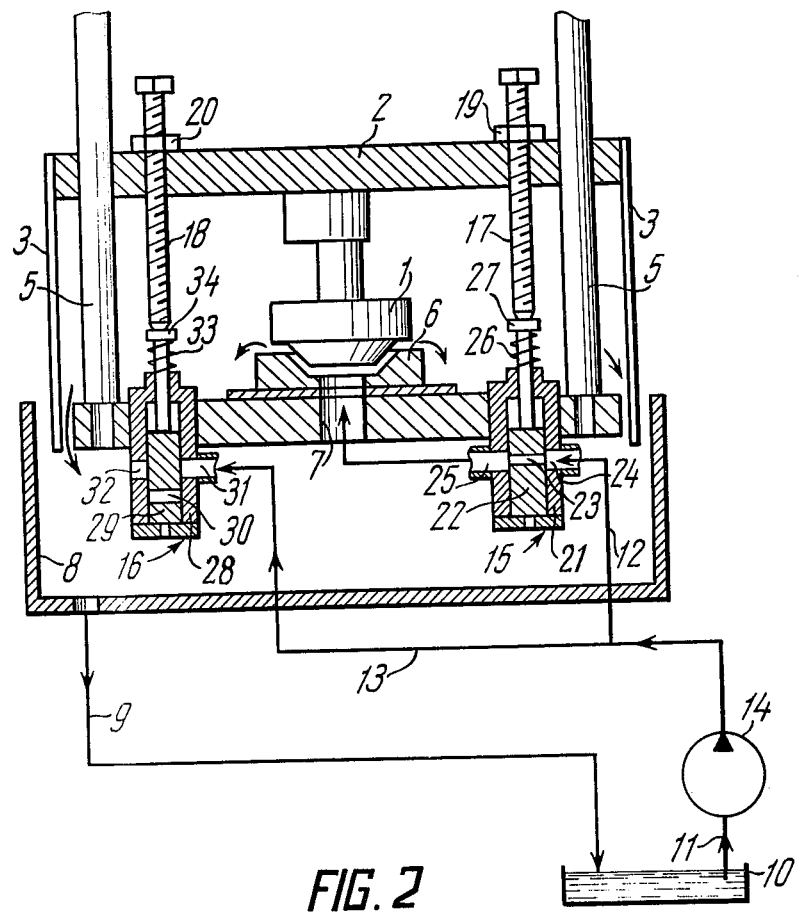
FIG. 2 is a longitudinal sectional view of the apparatus for electrochemical machining of workpieces in accordance with the invention, with the valve in the working line open.

FIG. 2 illustrates a position whereat the flow passage 23 of the valve member 23 is aligned with the inlet 24 and the outlet 25 of the housing 21 of the valve 15, i.e. the open position of the latter.

The disclosed apparatus for electrochemical machining of workpieces operates, as follows.

The electrode tool 1 (FIG. 1) is fed toward the workpiece 6 being machined by moving the crossbeam 2 downward along the guideways 5. This downward motion of the crossbeam 2 results in downward motion of the rods 17 and 18 moving therewith, the rods engaging, respectively, the stems 27 and 34 and driving them into their lowermost positions shown in FIG. 2.

In this position the flow passage 23 of the valve member 22 is aligned with the inlet 24 and the outlet 25 of the housing 21, and the valve 15 opens, permitting the flow of the working fluid in the working line 12. Meanwhile, the valve 16 in the bypass line 13 closes.

Now the working fluid is pumped from the tank 10 by the pump 14 via the common line 11, the working line 12 and the bore 7 into the working gap between the electrode tool 1 and the workpiece 6 being machined.

Upon having taken part in the machining operation, the working fluid flows into the intermediate vessel 8 wherefrom it returns into the tank 10 via the line 9.

With the machining operation completed, and it is required, e.g. to replace the workpiece 6 with a new one, the crossbeam 2 with the electrode tool 1 and the rods 17 and 18 is retracted into the topmost position (FIG. 1).

The stems 27 and 34 are thus relieved from the action exerted thereupon by the rods 17 and 18, and their respective springs 26 and 33 return them into their uppermost positions.

In this position, as it can be seen in Figure, the flow passage 30 of the spool valve member 29 is aligned with the inlet 31 and outlet 32 of the valve housing 28, and the valve 16 opens, permitting the flow through the bypass line 13. Meanwhile, the valve 15 in the working line 12 closes.

The working fluid is now being pumped by the pump 14 via the common line 11, the bypass line 13, the intermediate vessel 8 and the line 9 back into the tank 10, i.e. the working fluid is circulated, bypassing the machining area for the inter-operation interval.

Should a workpiece 6 of either a greater or a smaller vertical dimension than the previous one be placed onto the work table 4, the active vertical length of the rods 17 and 18 is adjusted accordingly. Furthermore, should it be necessary to reduce the rate of flow of the working fluid to the workpiece 6, the length of the rod 17 is adjusted so that in the lowermost position (FIG. 2) the flow passage 23 of the spool valve member 22 should be but partly aligned with the inlet 24 and the outlet 25 of the housing 21.

Thus, in the presently described apparatus the means controlling the switching over of the lines 12 and 13 is also the means for adjusting the rate of the flow of the working fluid, supplied for machining the workpiece 6.

When the inter-operation intervals are frequent and numerous, there is no necessity to turn on and off the pump 14, since the presently described apparatus provides for rapid, simple and reliable switching over of the flow of the working fluid to bypass the machining zone.

The herein disclosed apparatus for electrochemical machining of workpieces is particularly suitable for incorporation in electrochemical, electro-erosion, piercing-copying and other machines, wherever it is essential to provide for a normal operating duty of a pump supplying the working fluid for machining.

What is claimed is:

1. An apparatus for electrochemical machining of workpieces, comprising:
- a work table adapted to support thereon a workpiece being machined;
- and electrode tool adapted to be fed toward said workpiece for a machining operation and to be retracted therefrom for an inter-operation interval;
- a tank for a supply of a working fluid;
- an intermediate vessel;
- a working fluid line for supplying the working fluid from said supply tank to said workpiece being machined;
- a bypass line for circulation of the working fluid via said intermediate vessel into said supply tank;
- a common line extending from said supply tank to the point of branching off of said working and bypass lines;
- a pump mounted in said common line;
- a first valve mounted in said bypass line and having a control element;
- a second valve mounted in said working line and having a control element;
- a means for controlling the switching over of said working and bypass lines, including two rods;
- the first one of the two rods of said switching over control means being rigidly coupled with said electrode tool and extending in the direction of the feed thereof, with provisions for adjusting the length of said first rod;
- the second one of the two rods of the switching over control means being rigidly coupled with said electrode tool and extending in the direction of the feed thereof, with provisions for adjusting the length of said second rod;
- said first valve being fixed on said work table directly under said first rod for interaction of said first rod with said control element of said first valve, as said electrode tool is fed toward said workpiece;
- said first valve being adapted to close the flow through said bypass line upon the action being exerted by said first rod upon said control element thereof, and to permit the flow through said bypass line upon this action having ceased;
- said second valve being fixed on said work table directly under said second rod for interaction of said second rod with said control element of said second valve, as said electrode tool is fed toward said workpiece;
- said second valve being adapted to permit the flow through said working line upon the action being exerted by said second rod upon said control element thereof and to close the flow through said working line upon this action having ceased.

* * * * *